UNITED STATES PATENT OFFICE.

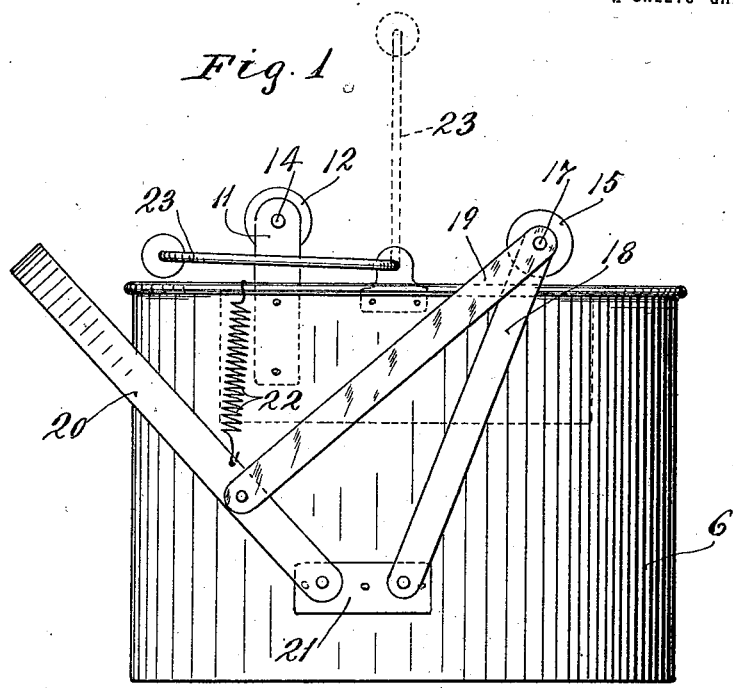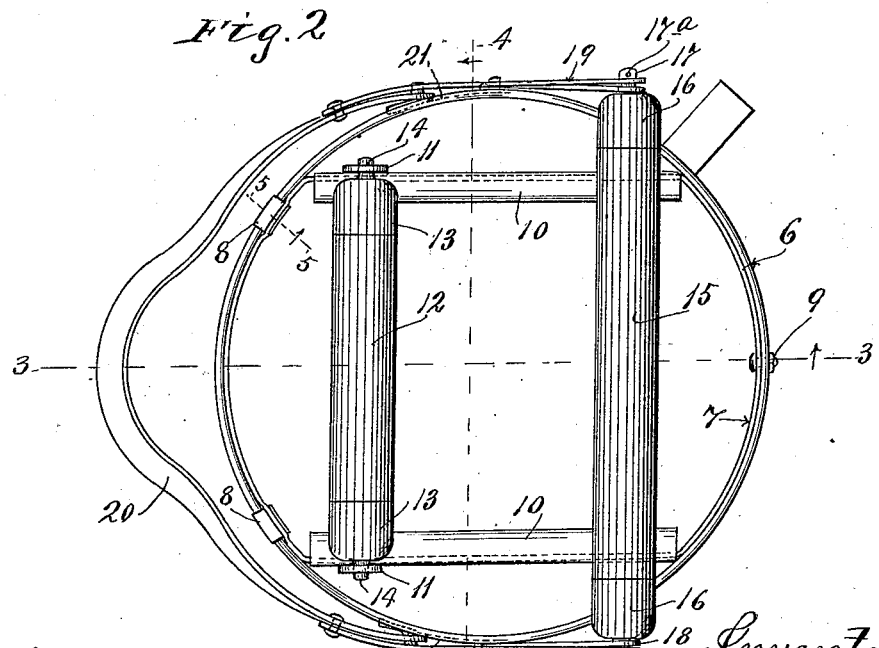

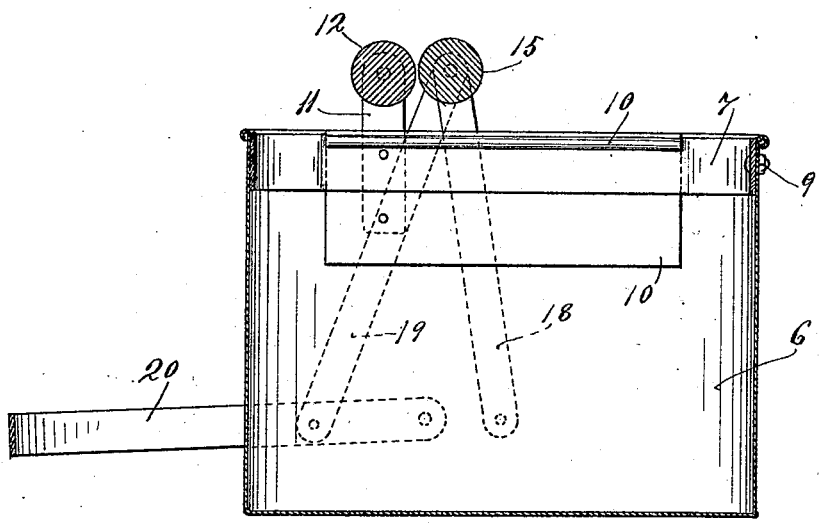
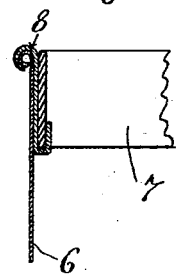
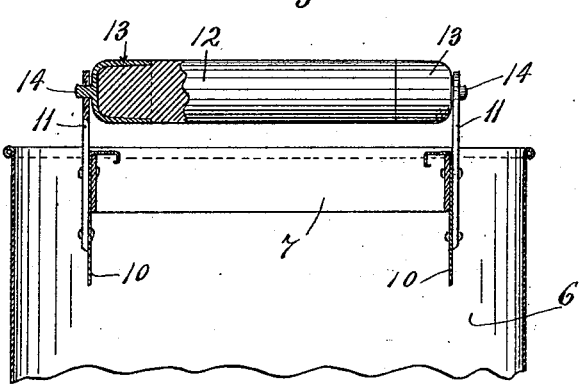

CLATON E. BURKE AND GROVE R. BECKWITH, OF MINNEAPOLIS, MINNESOTA, ASSIGNORS TO B. B. SPECIALTY CO., OF MINNEAPOLIS, MINNESOTA, A CORPORATION OF MINNESOTA.

MOP-WRINGER PAIL.

1,407,122.  Specification of Letters Patent.  Patented Feb. 21, 1922.

Application filed April 27, 1918. Serial No. 231,168.

*To all whom it may concern:*

Be it known that we, CLATON E. BURKE and GROVE R. BECKWITH, citizens of the United States, residing at Minneapolis, in the county of Hennepin and State of Minnesota, have invented certain new and useful Improvements in Mop-Wringer Pails; and we do hereby declare the following to be a full, clear, and exact description of the invention, such as will enable others skilled in the art to which it appertains to make and use the same.

This invention has for its object to provide an extremely simple and highly efficient mop wringer pail; and, to such ends, generally stated, the invention consists of the novel devices and combinations of devices hereinafter described and defined in the claims.

In the accompanying drawings, which illustrate the invention, like characters indicate like parts throughout the several views.

Referring to the drawings,

Fig. 1 is a side elevation of the improved pail;

Fig. 2 is a plan view thereof;

Fig. 3 is a vertical section on the line 3—3 of Fig. 2;

Fig. 4 is a transverse section on the line 4—4 of Fig. 2, some parts being removed; and Fig. 5 is a fragmentary vertical section on the line 5—5 of Fig. 2.

The pail, which is preferably of sheet metal structure, is indicated by the numeral 6. As a supporting means for the relatively fixed member and pair of wringer rollers, a marginal bearing frame 7 is fitted within and detachably secured to the upper portion of the pail. This frame 7 has parallel sides and segmental ends, the segmental ends fitting within the pail. The segmental portion of the frame 7, that is at the front of the pail, is hung upon stirrup straps 8, the upper ends of which are bent around the end of the pail and the lower ends of which are upturned to afford seats to receive said frame 7. At the back of the pail, the segmental portion of the frame 7 is detachably secured to the pail by a short nut-equipped bolt 9. When the bolt 9 is removed, the frame 7 can be lifted from position, but when the said bolt 9 is applied, said frame is rigidly secured to the pail. When the said frame is applied to the pail, it not only affords a bearing for the fixed roller, but stiffens the pail. Sheet metal plates 10 are riveted or otherwise rigidly secured to the parallel sides of the frame 7 and vertical roller-supporting pedestals, shown as in the form of flat metal straps 11 are rigidly secured to the said plates 10 and to the parallel sides of the frame 7.

The relatively fixed wringer roller 12 is journaled to the pedestals 11. As preferably constructed, said roller 12 is formed with metal caps 13 having trunnions 14 that are directly journaled in the said pedestals 11.

The movable wringer roller 15 is considerably longer than the fixed roller 12 and, in fact, is as long as the diameter of the pail and, like the roller 12, is provided with metal end caps 16 terminating in trunnions 17. The trunnions 17 are journaled, each in the upper ends of two link-acting metal arms 18 and 19, preferably in the form of flat metal straps.

A bail-like treadle lever 20 embraces the sides of the pail and its ends, and the lower ends of the arms 18 are independently pivoted at points offset from each other to trunnion-equipped reinforcing plates 21. The arms 19, at their lower ends, are pivotally connected to the lower portions of the sides of the treadle lever 20. One or more coiled springs 22 operate normally to raise the treadle lever 20 and retract the wringer roller 15 from the wringer roller 12; and, as shown, the said spring is attached at the lower end to one of the arms of said treadle lever and at the upper end to the rim of the pail.

The upper ends of the arms 18 and 19 are overlapped and held against lateral displacement by pins or cotters 17$^a$ applied to the outer ends of the trunnions 17. The numeral 23 indicates a carrying bail applied to the pail in the usual way.

Normally, of course, the wringer rollers will stand, as shown in Figs. 1 and 2, so that the mop cloth may be freely passed between the rollers. In the wringing action, the mop cloth, by pulling upward on the cloth, will be pulled upward on the rollers, while the rollers are forced toward each other approximately as shown in Fig. 3. The squeezing action of the rollers is, of course, procured by stepping on the treadle lever 20. In the downward action, produced by stepping on the treadle lever 20, the movable wringer roller 15 will move on the arc of a circle struck from the axis on the pivotal connection between the arm 18 and the plate 21 and this movement will be imparted through the arms or link-acting members 19. The treadle lever 20 and the roller-supporting arms 18 do not, therefore, act as a bell crank lever, but the two are capable of different movements, each on its own pivot and the squeezing force is taken in tension through the arms or links 19. This gives a very strong construction with a minimum of metal and, moreover, there is produced a sort of a toggle action between the treadle lever 20 and arms or links 19, which gives great squeezing power. The construction described is also very cheap to make, as well as strong, durable and efficient. The wringer rollers, with their metallic end caps set in flush with the bodies of the rollers, give very great strength and durability to the rollers and prevent cracking of the rollers under expansion and contraction, due to frequent wetting and drying.

Plates 10 afford mop retaining guides which prevent the mop from spreading beyond or, in fact, as far outward as the ends of the short roller 12, and, of course, the ends of the long roller 15 are far beyond said guides, so that there is no possibility of the mop becoming wrapped around the trunnions of the rollers. The long rollers are brought outside of the pail so that the links 18 and 19, pivoted to the sides of the pail and to the bail 20, may be straight flat members.

It is important to note, (see Fig. 1) that the pivotal connections between the treadle 20 and the bearing plate 21, are at points that are always between the diverging lines of the co-operating links 18 and 19, or, otherwise stated, the pivots of the treadle are in the angle represented by the diverging links 18 and 19, regardless of the position of the treadle. This gives such distance between the lower pivots of the links 18 and 19 that the treadle is given great power because the said parts never closely approximate dead center and never pass from one side to the other of the dead centers. This arrangement also permits the diverging links to be of approximately the same length and permits the links 18 to be pivoted approximately on the level with the pivotal connection between the bail and the pail.

What we claim is:—

1. The combination with a mop pail and a stationary squeezing roller supported thereabove, of a co-operating movable squeezing roller, a bail having straight ends forming a treadle and having its ends pivoted to the exterior sides of the pail, and a pair of straight links at each exterior side of the pail having their upper ends pivoted to the end of the movable roller, one of the links of each pair having its end pivoted to the treadle and the other link of each pair having its end pivoted to the exterior of the pail adjacent to the pivotal point of the treadle so that said pivotal point of the treadle is always in the angle of divergence of said links whereby a dead center position is avoided.

2. The combination with a mop pail, of a marginal supporting-frame having parallel sides and segmental ends fitting within the rim of the pail, stirrups hung on the rim of the pail and supporting one of the segmental ends of said frame, means for securing the other segmental end of said frame to the pail, fixed bearings on the sides of said frame, a wringer roller journaled to said fixed bearings, laterally spaced arms and a bail-like treadle lever pivoted to opposite sides of the pail at different points, and links connecting the sides of the treadle lever to said arms.

3. A device of the class described having in combination a pail, a fixed roller journaled above the same, a movable roller above the pail adapted to move to and from the fixed roller, said movable roller having its ends journaled in two links at each side thereof, one each of which is pivoted at its other end to the side of the pail, a bail having its ends pivoted to the pail adjacent the ends of said last mentioned links and in the same horizontal plane therewith and extending upwardly and away from said pail, the lower end of the other links which are journaled to the movable roller being connected to the sides of the bail above its pivot.

4. In a mop wringer pail device comprising a pail and fixed and movable rollers supported thereabove, a support for the fixed roller comprising an endless frame having parallel side portions and segmental end portions, the latter fitting the interior of the pail adjacent its top and forming a brace therefor, angle plates secured to the parallel side portions of said frame and having one side extending inwardly therebetween, and means supporting said members from the upper edges of said pail.

In testimony whereof we affix our signatures in presence of two witnesses.

CLATON E. BURKE.
GROVE R. BECKWITH.

Witnesses:
CLARA DEMAREST,
F. D. MERCHANT.